United States Patent
Sakaue et al.

(10) Patent No.: US 7,751,086 B2
(45) Date of Patent: Jul. 6, 2010

(54) IMAGE PROCESSING APPARATUS AND IMAGE PROCESSING METHOD FOR GENERATING IMAGE DATA FOR FORMING AN IMAGE USING A PLURALITY OF COLOR MATERIALS OF SIMILAR COLORS AND DIFFERENT DENSITIES

(75) Inventors: Tsutomu Sakaue, Yokohama (JP); Shinichi Kato, Kawasaki (JP); Ritsuko Otake, Kawasaki (JP); Yoko Sato, Yokohama (JP); Yoichi Kashibuchi, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 881 days.

(21) Appl. No.: 11/460,438

(22) Filed: Jul. 27, 2006

(65) Prior Publication Data

US 2007/0024933 A1    Feb. 1, 2007

(30) Foreign Application Priority Data

Aug. 1, 2005    (JP)    ............... 2005-222992

(51) Int. Cl.
| | |
|---|---|
| G06K 15/00 | (2006.01) |
| G06K 9/40 | (2006.01) |
| H04N 1/40 | (2006.01) |
| H04N 1/407 | (2006.01) |
| H04N 1/409 | (2006.01) |
| H04N 1/46 | (2006.01) |
| G06T 5/00 | (2006.01) |
| G03F 3/08 | (2006.01) |

(52) U.S. Cl. .............. 358/2.1; 358/3.26; 358/3.27; 358/515; 358/518; 358/521; 358/530; 358/532; 382/275

(58) Field of Classification Search ................. 358/1.9, 358/3.27, 515, 521, 532, 2.1, 3.01, 3.26, 358/518, 530; 382/162, 254, 260, 263, 266, 382/274, 275
See application file for complete search history.

(56) References Cited

U.S. PATENT DOCUMENTS

| | | | | |
|---|---|---|---|---|
| 4,959,659 | A | * | 9/1990 | Sasaki et al. ................. 347/43 |
| 5,165,072 | A | * | 11/1992 | Kurita et al. ................. 358/448 |
| 5,166,810 | A | * | 11/1992 | Sorimachi et al. ........... 358/462 |
| 5,181,068 | A | * | 1/1993 | Morikawa .................... 355/77 |

(Continued)

FOREIGN PATENT DOCUMENTS

JP    08-118683 A    5/1996

(Continued)

*Primary Examiner*—King Y Poon
*Assistant Examiner*—Vincent R Peren
(74) *Attorney, Agent, or Firm*—Canon U.S.A., Inc., IP Division (57) ABSTRACT

An image processing apparatus configured to generate image data for forming an image using a plurality of color materials of similar colors and of different densities includes a gradation changing unit configured to conduct a gradation changing process for changing gradation of C, M, Y, and K signals of an image and a color separation unit configured to conduct a color separation process for separating color component data for a dark color material into color component data for a dark color material and color component data for a light color material. The gradation changing unit is configured to conduct the gradation changing process before the color separation unit conducts the color separation process.

2 Claims, 12 Drawing Sheets

U.S. PATENT DOCUMENTS

| | | | |
|---|---|---|---|
| 5,313,313 A * | 5/1994 | Sato | 358/514 |
| 5,420,938 A * | 5/1995 | Funada et al. | 382/173 |
| 5,452,105 A * | 9/1995 | Tamagaki et al. | 358/453 |
| 5,875,036 A * | 2/1999 | Sasanuma | 358/3.24 |
| 5,963,714 A * | 10/1999 | Bhattacharjya et al. | 358/1.9 |
| 5,984,449 A * | 11/1999 | Tajika et al. | 347/15 |
| 6,027,196 A * | 2/2000 | Gotoh et al. | 347/7 |
| 6,268,931 B1 * | 7/2001 | Yamada et al. | 358/1.9 |
| 6,498,910 B2 | 12/2002 | Haneda | |
| 2002/0080394 A1 * | 6/2002 | Ogasahara et al. | 358/1.15 |
| 2003/0133606 A1 * | 7/2003 | Yano et al. | 382/162 |
| 2004/0218235 A1 * | 11/2004 | Kawano | 358/505 |
| 2005/0200865 A1 * | 9/2005 | Yorimoto et al. | 358/1.9 |
| 2005/0213160 A1 * | 9/2005 | Namikata | 358/3.27 |
| 2006/0127113 A1 * | 6/2006 | Sato | 399/49 |
| 2006/0127114 A1 * | 6/2006 | Mizuno | 399/49 |

FOREIGN PATENT DOCUMENTS

| | | |
|---|---|---|
| JP | 8118683 A | 5/1996 |
| JP | 11-355593 A | 12/1999 |
| JP | 2000-015798 A | 1/2000 |
| JP | 2002-125121 A | 4/2002 |
| JP | 2000-196871 A | 7/2002 |

* cited by examiner

IMAGE PROCESSING APPARATUS AND IMAGE PROCESSING METHOD FOR GENERATING IMAGE DATA FOR FORMING AN IMAGE USING A PLURALITY OF COLOR MATERIALS OF SIMILAR COLORS AND DIFFERENT DENSITIES

BACKGROUND OF THE INVENTION

1. Field of the Invention

The present invention relates to an image processing apparatus and an image processing method. In particular, the present invention relates to image processing in the case where an image is formed using a plurality of color materials, such as toner or ink, of similar colors.

2. Description of the Related Art

The market demand for high quality printers has been growing year after year, and printers with an increased number of colors in the color materials such as toners as compared to conventional four-color ink or toner printers have been proposed and made into products. For example, there are inkjet printers which form images with six colors of ink, including, in addition to the four general colors, cyan (C), magenta (M), yellow (Y), and black (B), light cyan (c) and light magenta (m) to reduce the grainy effect. In ink of light cyan (c) and light magenta (m), the density of a colorant, such as dye, is low. Such six-color printers have also been proposed in the field of electrophotographic printers as in the inkjet printers.

In six-color printers, data for a color material of low density is generated by decomposing data for a dark color material (ink or toner) such as cyan (C) and magenta (M). To be more precise, in the case of printing an image read by a reader, image processing such as a shading correction, color space conversion, logarithmic conversion, black generation, and color correction is conducted on the read image. Data for each of dark color materials C, M, Y, and K is obtained first. Among these data, data for dark color materials C and M is separated into data for light color materials c and m and data for dark color materials C and M (see Japanese Patent Application Laid-Open No. 2001-290319 and Japanese Patent Application Laid-Open No. 2001-318499, which correspond to U.S. Pat. No. 6,498,910). Furthermore, gamma conversion and MTF (modular transfer function) correction are conducted on the color material data including the dark and light color material data obtained by the color separation. The processed data is used as data for image formation in the printer.

In a color separation for a plurality of color materials of similar colors and with different densities as described above, color data is separated such that the amount of use of each color material is switched. For example, the color separation is conducted using a table in which there is a switching gradation value. In the table, only data for a light color material is output with a value corresponding to an input value when the input value does not reach the switching gradation value, and only data for a dark color material is output with a value corresponding to an input value when the input value exceeds the switching gradation value. In such a case, if, for example, edge enhancement processing is conducted on each of data for dark and light color materials in which a switching point exists, a change in density at the switching point, which is not originally an edge in the image, becomes enhanced. As a result, a density gap can appear on the image to be printed. In addition, in the case where an under color removal process is conducted on each of data for dark and light color materials, data for densities lower than a certain level is eliminated. As a result, a section in which there is a drastic change in density can be generated in each data. Such a section in which there is a density change can appear as a density gap in the resulting printed image. These density gaps can degrade the quality of a printed image.

Furthermore, even if there is no apparent switching point or section in which there is a change in density as mentioned above, a density gap or a density nonuniformity can be generated in the case where a gradation changing process other than an edge enhancement or a background color removal mentioned above is conducted on each of dark and light color material data.

SUMMARY OF THE INVENTION

The present invention is directed to an image processing apparatus and an image processing method which are capable of preventing or reducing image quality degradation such as a density gap or a density nonuniformity that can occur in the case where printing is conducted using a plurality of color materials of similar colors and of different densities.

According to an aspect of the present invention, an image processing apparatus is configured to generate image data for forming an image using a plurality of color materials of similar colors and of different densities. The image processing apparatus includes a gradation changing unit configured to conduct a gradation changing process for changing gradation of C, M, Y, and K signals of an image and a color separation unit configured to conduct a color separation process for separating color component data for a dark color material into color component data for a dark color material and color component data for a light color material. The gradation changing unit is configured to conduct the gradation changing process before the color separation unit conducts the color separation process.

According to another aspect of the present invention, an image processing method for generating image data for forming an image using a plurality of color materials of similar colors and of different densities includes conducting a gradation changing process for changing gradation of C, M, Y, and K signals of an image, and conducting a color separation process for separating color component data for a dark color material into color component data for a dark material and color component data for a light color material. The gradation changing process is conducted before the color separation process.

According to an aspect of the present invention, a gradation changing process for changing gradation of an image is conducted before a color separation process for generating dark and light color component data. Accordingly, a density gap or a change in gradation in dark and light color component data, which can occur if the gradation changing process is conducted after the color separation process, can be prevented or reduced. As a result, the degradation of the quality of a printed image based on the combining of dark and light color component data can be reduced.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Exemplary embodiments of the invention will be described in detail below with reference to the drawings.

First Exemplary Embodiment

Configuration of Image Forming Apparatus

Figure 1:
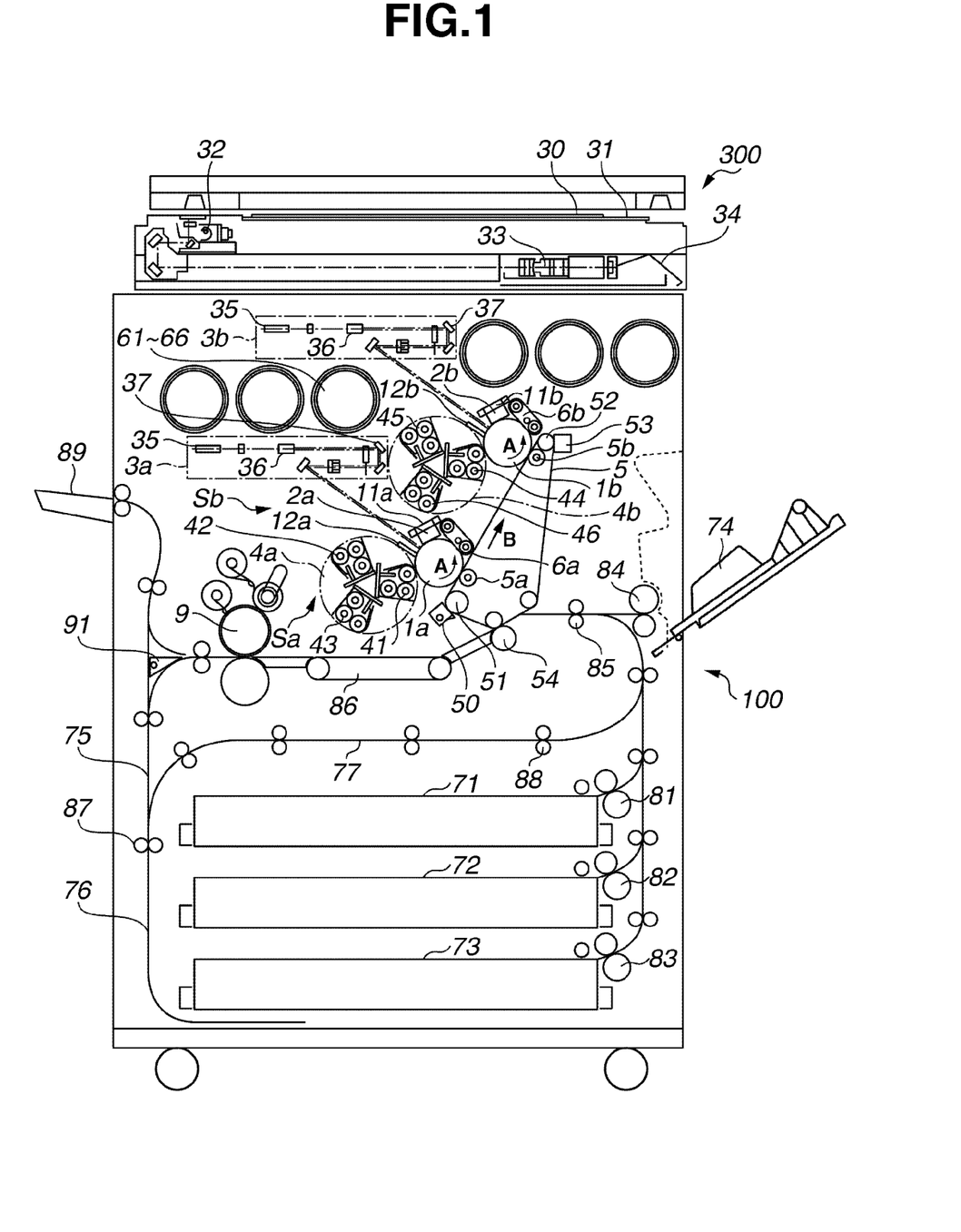
FIG. 1 is a cross-sectional view of an image forming apparatus which performs full-color printing according to an exemplary embodiment of the present invention.

FIG. 1 is a cross-sectional view of an image forming apparatus which can perform full-color printing according to an exemplary embodiment of the present invention. The apparatus is a multifunctional peripheral including copy, printer, and facsimile functions and having an image reader unit 300 on its upper part and a printer unit 100 in its lower part.

A document 30 is placed on a document board glass 31 in the image reader unit 300 and is exposure-scanned by an exposure lamp 32. Reflected-light image from the document 30 is condensed onto a full-color charge-coupled device (CCD) sensor 34 by a lens 33, so that color separation image signals (not shown) are obtained. The color separation image signals are supplied to a video processing unit (not shown) through an amplifying circuit. The processed image signals are then supplied to the printer unit 100 through an image memory (not shown). Similarly, image signals from a computer or from a facsimile machine are supplied to the printer unit 100 in addition to the above signals from the image reader unit 300. An operation of the printer unit 100 based on the signals from the image reader unit 300 is described below.

There are two main image forming units in the printer unit 100, a first image forming unit Sa which includes a first photosensitive drum 1a, and a second image forming unit Sb which includes a second photosensitive drum 1b. The two image forming units Sa and Sb have almost the same configuration (form) for reasons such as cost reduction. For example, the configuration and form of developing devices 41 to 46 to be described later are almost the same. Consequently, the developing devices 41 to 46 can be interchanged.

Two drum-type photosensitive members (hereinafter referred to as photosensitive drums), the first photosensitive drum 1a and the second photosensitive drum 1b, are each supported rotatably in a direction indicated by an arrow A in FIG. 1. In the vicinity of the photosensitive drums 1a and 1b, there are arranged pre-exposure lamps 11a and 11b, corona charging devices (charging units) 2a and 2b, a first exposure unit 3a and a second exposure unit 3b that are laser exposure optical systems, potential sensors 12a and 12b, moving members (developing rotary members) 4a and 4b that are rotatable retaining members for developing devices, two sets of three developing devices 41 to 43 and 44 to 46 that store developers of different colors and are held in each retaining member, primary transfer rollers 5a and 5b that are the primary transfer units, and cleaning devices 6a and 6b. Five or more developing devices can be used to achieve a high-quality image. In the present exemplary embodiment, six developing devices 41 to 46 are arranged.

The developing device 41 contains a magenta toner, the developing device 42 contains a cyan toner, the developing device 43 contains a light magenta toner with low density, the developing device 44 contains a yellow toner, the developing device 45 contains a black toner, and the developing device 46 contains a light cyan toner.

The dark-color and light-color developers have different amounts of colorants with the same spectral characteristic. Therefore, although the spectral characteristic of the colorant in the light magenta toner is the same as that in the magenta toner, the content of colorant in the light magenta toner is smaller than that of the magenta toner. Similarly, the light cyan toner has the same spectral characteristic as the cyan toner but has a smaller content of colorant.

A developing device storing a toner with a spectral characteristic different from that of cyan, magenta, yellow, and black toners mentioned above, for example a metallic toner such as gold and silver or a fluorescent toner containing a fluorescence agent, can also be mounted onto the developing rotary member. In addition, although the developing device in the present exemplary embodiment contains a two-component developer in which the toner and the carrier are combined, a one-component developer composed of only the toner can also be contained.

As described above, dark and light color toners for magenta and cyan are used. Accordingly, the grainy effect in a printed image can be reduced and the reproducibility of a light image such as the human skin can be improved.

In the laser exposure optical systems (exposure units) 3a and 3b, an image signal from the image reader unit 300 is converted into an optical signal by a laser output unit (not shown). A laser beam E serving as the optical signal is reflected by a polygon mirror 35 and is then projected onto an exposure position on the surface of the photosensitive drums 1a and 1b through a lens 36 and mirrors 37.

The photosensitive drums 1a and 1b are rotated in the direction indicated by the arrow A at the time of image formation in the printer unit 100. After charges are removed by pre-exposure lamps 11a and 11b, the photosensitive drums 1a and 1b are uniformly charged by the charging devices 2a and 2b. The photosensitive drums 1a and 1b are irradiated with a light image E for each separated color based on image data obtained through the image processing to be described later, and a latent image is formed on the surface of each of the photosensitive drums 1a and 1b.

Next, the first developing rotary member 4a and the second developing rotary member 4b, which are rotatable retaining members for the developing devices, are rotated, and predetermined developing devices among the developing devices 41 to 46 located on the photosensitive drums 1a and 1b are operated. The reverse development of the electrostatic latent images on the photosensitive drums 1a and 1b is then conducted, and toner images are formed on the surfaces of the photosensitive drums 1a and 1b with toner including resin and colorant as the principal substance. At this time, a developing bias is applied to the developing device.

Furthermore, the toners within the developing devices 41 to 46 are resupplied at a predetermined timing by toner storage units (hoppers) 61 to 66 for respective colors, which are placed between and beside the laser exposure optical systems 3a and 3b. Consequently, the toner ratio (or the toner amount) in the developing device is kept constant.

The primary transfer of toner images formed on the photosensitive drums 1a and 1b is conducted sequentially onto an intermediate transfer member (an intermediate transfer belt) 5, which acts as a transfer medium, by the primary transfer rollers (primary transfer units) 5a and 5b. Thus, the toner images are formed on the intermediate transfer member 5 in an overlapped manner. At this time, a primary transfer bias is applied to the primary transfer rollers 5a and 5b. As a result, each toner image is superimposed sequentially on the intermediate transfer belt 5 to form a full-color toner image. Then, the secondary transfer roller 54 conducts a secondary transfer of the full-color toner image collectively onto a paper sheet serving as a recording material. At this time, a secondary transfer bias is applied to the secondary transfer roller 54.

The intermediate transfer belt 5 is driven by a driving roller 51. A cleaning device 50 is positioned opposite to the driving roller 51 across the intermediated transfer belt 5 and is movable away from the intermediated transfer belt 5. The photosensitive drums 1a and 1b are set on the transfer surface which is a coplanar section formed by the intermediate transfer belt 5 entrained about the two rollers 51 and 52. The primary transfer rollers 5a and 5b, which are primary transfer units, are placed facing the photosensitive drums 1a and 1b across the intermediated transfer belt 5.

In addition, a sensor 53 for detecting the displacement and the density of each image transferred from the photosensitive drums 1a and 1b is located at the downstream position in the moving direction B of the intermediate transfer belt 5 and facing the driven roller 52. The sensor 53 is used to control each of the image forming units Sa and Sb in correcting the image density, the toner amount, the timing for writing an image, and the starting position for writing an image.

Furthermore, the transfer cleaning device 50 facing the driving roller 51 in the upstream position is pressed by the driving roller 51 after superimposing an image on the intermediate transfer belt 5 with the required colors, and cleans the residual toner on the intermediate transfer belt 5 after the transfer of an image onto a recording material. The transfer cleaning device 50 moves away from the intermediate transfer belt 5 when the cleaning is finished.

The recording material is fed one by one from each storage unit 71, 72, or 73, or from a manual feed tray 74 by a paper feed unit 81, 82, 83, or 84. A registration roller 85 corrects the oblique position of the recording material. The recording material is then fed to a secondary transfer unit between the secondary transfer roller 54 and the intermediate transfer belt 5 at a desired timing.

At the secondary transfer unit, a toner image is transferred onto the recording material. The recording material then passes through a conveyance unit 86. The toner image on the recording material is fixed by a thermal roller fixing device 9. The recording material is then ejected onto a paper discharge tray 89 or onto a paper post-processing apparatus (not shown).

The residual toner on the intermediate transfer belt 5 is cleaned by the transfer cleaning device 50 as described, and the intermediate transfer belt 5 is again used in the primary transfer process of the image forming units Sa and Sb.

In the case where images are formed on both sides of the recording material, a conveyance path switching guide 91 is driven immediately after the recording material is discharged from the fixing device 9, and guides the recording material into a surface reverse path 76 through a vertical conveyance path 75. By the reversal rotation of a reversal roller 87, the recording material is conveyed to a two-sided conveyance path 77 in a direction opposite to its supply direction with its trailing edge at the time of being supplied as a leading edge. The recording material passes through the two-sided conveyance path 77 and reaches a two-sided conveyance roller 88, at which the obliqueness is corrected and the timing for further conveyance is adjusted. The recording material is then conveyed to the registration roller 85 at the desired timing. Then, an image is formed on the other surface of the recording material by the above-described image forming process.

Configuration of Controller Unit and Image Processing Unit

Figure 2:
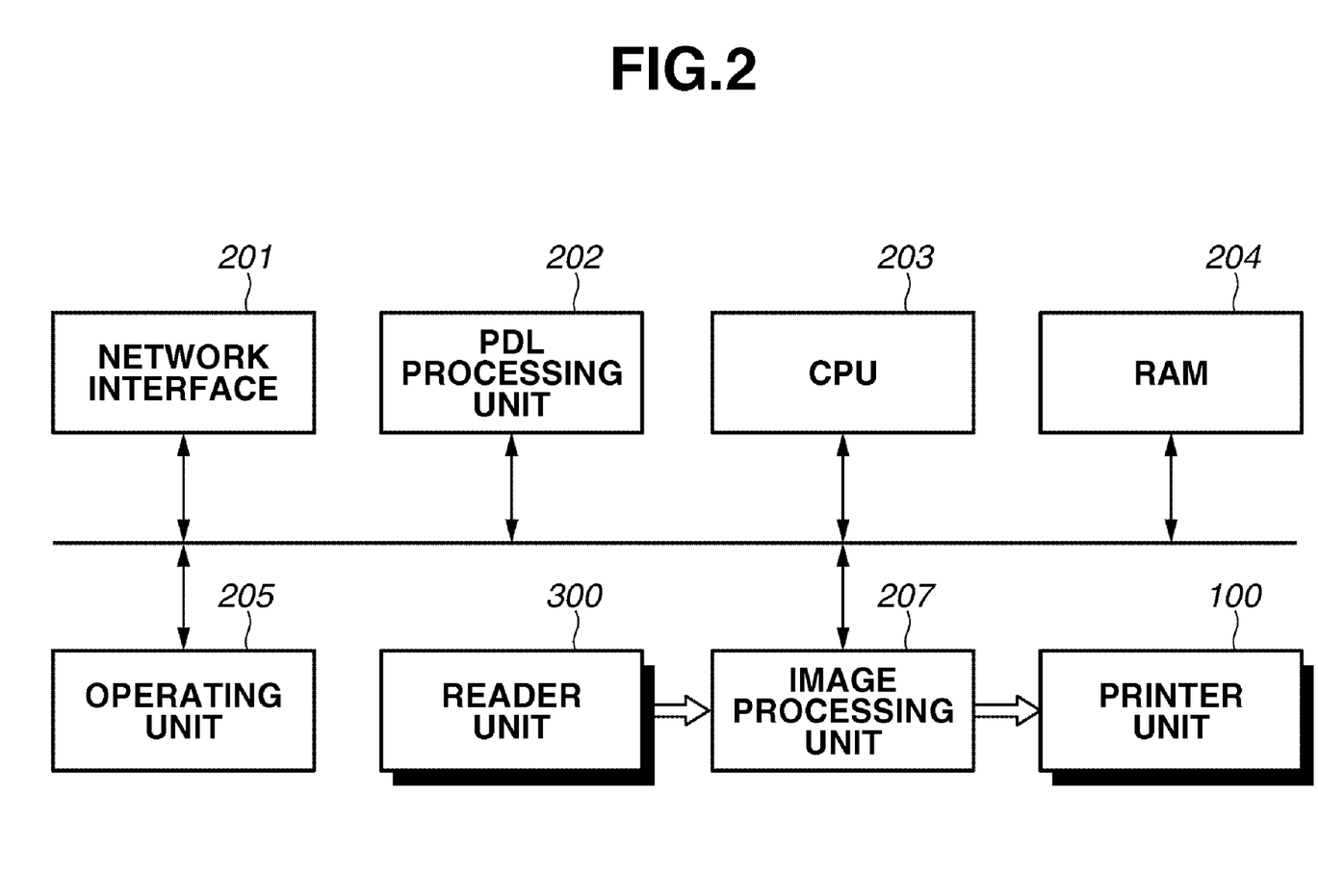
FIG. 2 is a block diagram of a controller unit for controlling the image forming apparatus shown in FIG. 1.

FIG. 2 is a block diagram of a controller unit which controls the image forming apparatus in FIG. 1. In the controller unit, an operating unit 205 is used by the user to operate the apparatus by inputting an instruction or is used for displaying the various states of the apparatus. An image processing unit 207 receives an image signal from the image reader unit 300, conducts appropriate image processing on the image signal, and sends the processed signal to the printer unit 100. A network interface (I/F) 201 receives PDL (page description language) data from a source such as an external host computer. A PDL processing unit 202, which operates on a CPU (central processing unit) 203 according to a program stored in a RAM 204, conducts a rendering process on the PDL data received by the network I/F 201 and then sends the processed data to the image processing unit 207. The CPU 203 controls the entire flow of the image processing according to a program stored in the RAM 204. Other components such as a facsimile receiving unit can be set in the controller unit.

Figure 3:
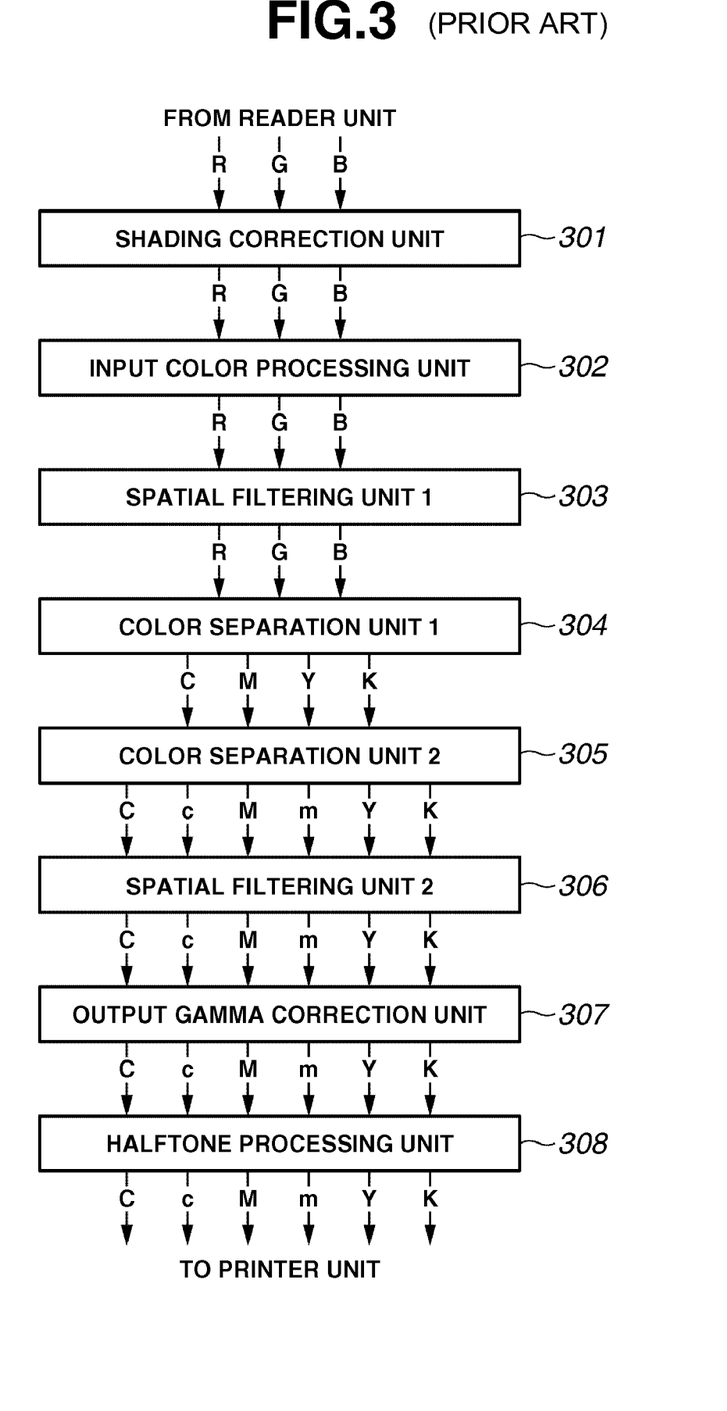
FIG. 3 is a block diagram of a conventional image processing unit.

The generation of a density gap caused by conducting image processing mentioned earlier is described below. FIG. 3 is a block diagram of a conventional image processing unit.

In a reader unit, an original document is read by a CCD to obtain a luminance image signal, which is input into the image processing unit as a digital image signal. In many cases, 8 bits (256 gradations) are used in one pixel. The thus-obtained RGB signals are subjected to a white correction process in a shading correction unit 301 and an input masking process in an input color processing unit 302, so that color turbidity caused by the spectroscopic characteristic of the CCD is removed. The frequency characteristic of the input image is corrected in a spatial filter unit 1 (303), which mainly conducts a smoothing process aimed at removing the specific frequency component of a halftone dot original. In order to do so, it is desirable to conduct an area extraction process (not shown) in which the halftone dot section and the text section are distinguished and the feature is extracted pixel by pixel, to switch the spatial filter and conduct the smoothing process only on the halftone dot section.

In a color separation unit 1 (304), a color separation process is conducted on the RGB signals (each color being of 8 bits) obtained by the aforementioned processes to obtain C, M, Y, and K signals (each color being of 8 bits). In a color separation unit 2 (305), the C and M signals among the obtained C, M, Y, and K signals are separated into color signals C, c, M, and m (each color being of 8 bits), which include the light color material signals.

Figure 4:
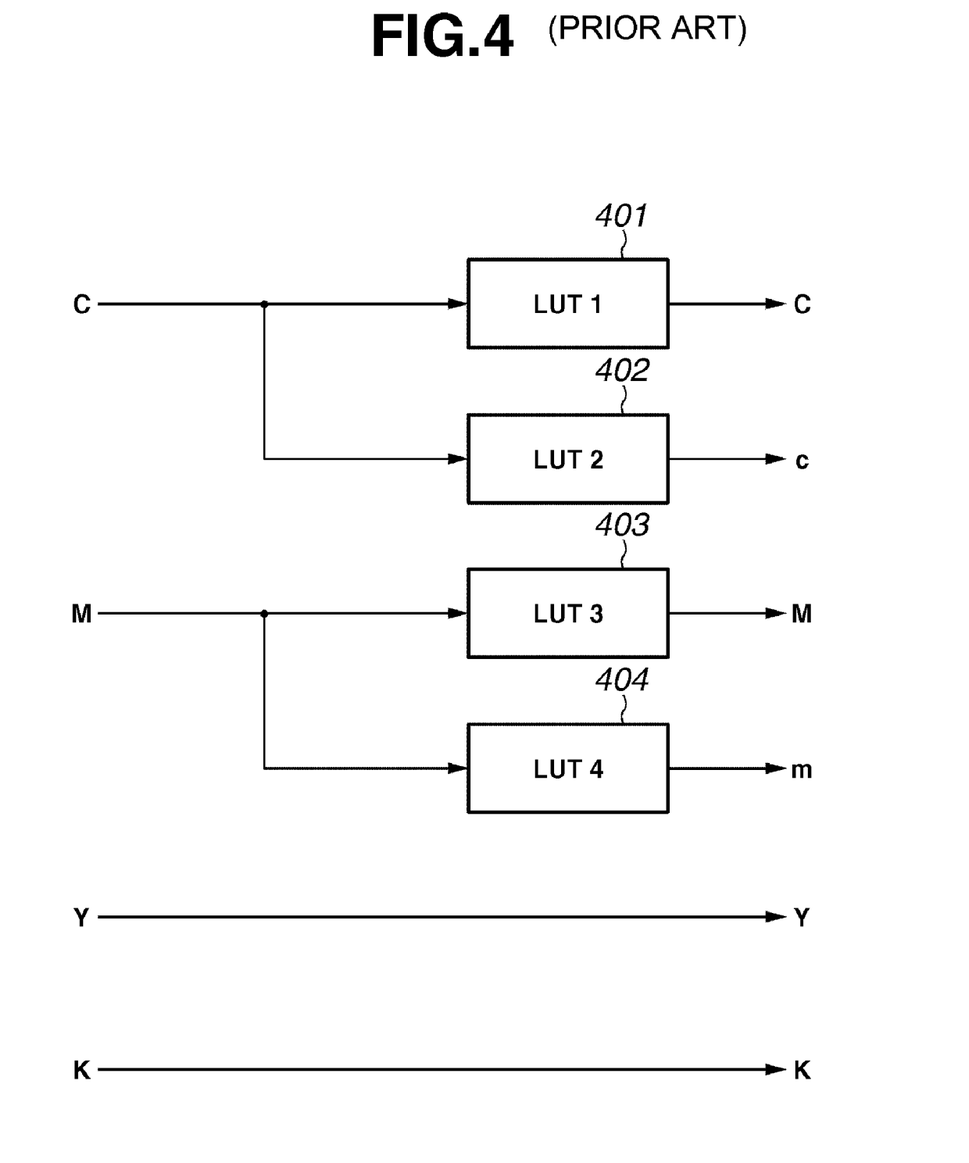
FIG. 4 shows an example of a process in a color separation unit shown in FIG. 3.

FIG. 4 illustrates an example of the process in the color separation unit 2 (305). Among the C, M, Y, and K signals obtained in the color separation unit 1 (304), signals C and M are each separated into similar colors C and c and similar colors M and m, respectively, in the color separation unit 2 (305). For example, the signal C branches to be input into a look-up table (LUT) 1 (401) and an LUT 2 (402). The output signal from the LUT 1 (401) is a signal C for dark toner, and the output signal from the LUT 2 (402) is a signal c for light toner. Similarly, the signal M branches to be input into a look-up table (LUT) 3 (403) and an LUT 4 (404). The output signal from the LUT 3 (403) is a signal M for dark toner, and the output signal from the LUT 4 (404) is a signal m for light toner.

Figure 5:
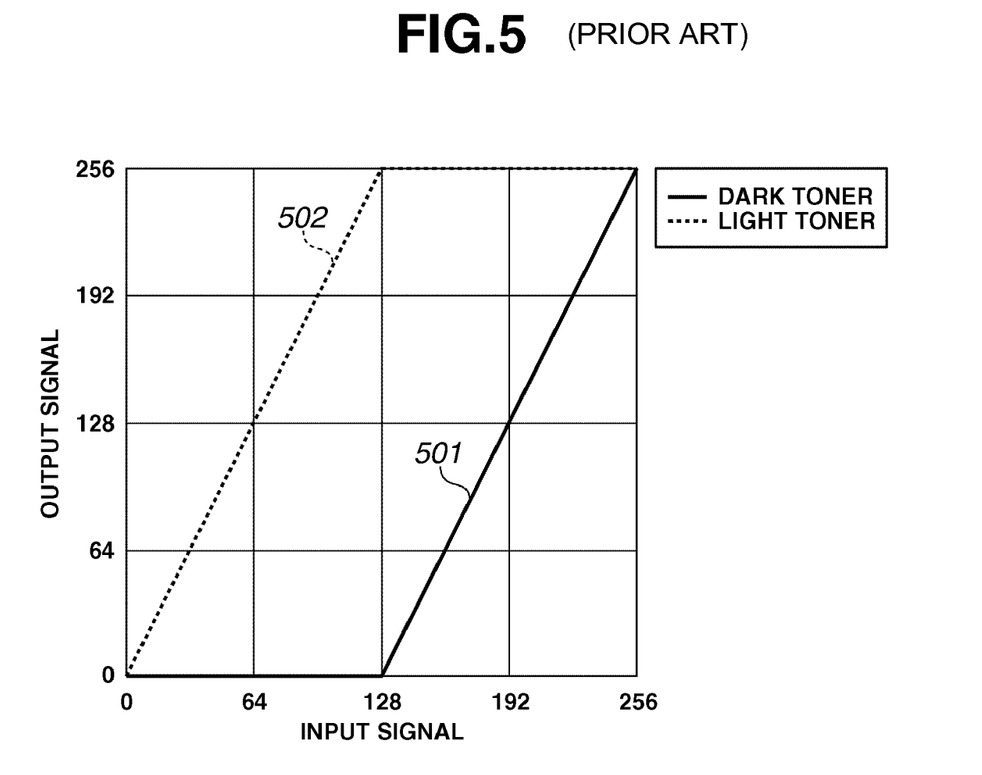
FIG. 5 shows an example of a table for switching signals for dark and light color components used in a color separation process.

FIG. 5 illustrates an example of the conversion characteristics of LUTs. In FIG. 5, an LUT 501 indicates the conversion relationship for a dark toner LUT, and an LUT 502 indicates the conversion relationship for a light toner LUT. In FIG. 5, the horizontal axis represents an input signal to the LUT and the vertical axis represents an output signal.

As shown in FIG. 5, as the input signal in the light toner LUT 502 increases from 0, the output signal also increases. When the gradation value of the input signal reaches 128, the output signal becomes saturated and reaches 255, which is the maximum value for an 8-bit signal. When the gradation value of the input signal is between 128 and 255, the gradation value of the output signal is kept at 255. On the other hand, in the dark toner LUT 501, when the gradation value of the input signal is between 0 and 128, the gradation value of the output signal is 0. When the gradation value of the input signal exceeds 128, the gradation value of the output signal increases, and when the gradation value of the input signal reaches 255, which is the maximum value of an 8-bit signal, the gradation value of the output signal becomes 255 as well.

Figure 6A:
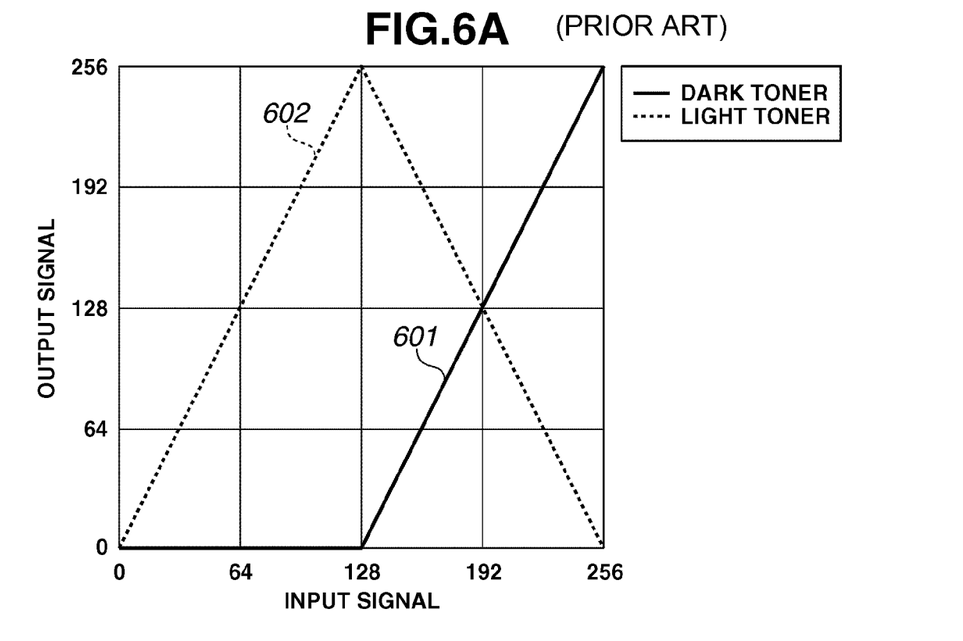
FIG. 6A and FIG. 6B show other examples of a table for switching signals for dark and light color components used in a color separation process.
Figure 6B:
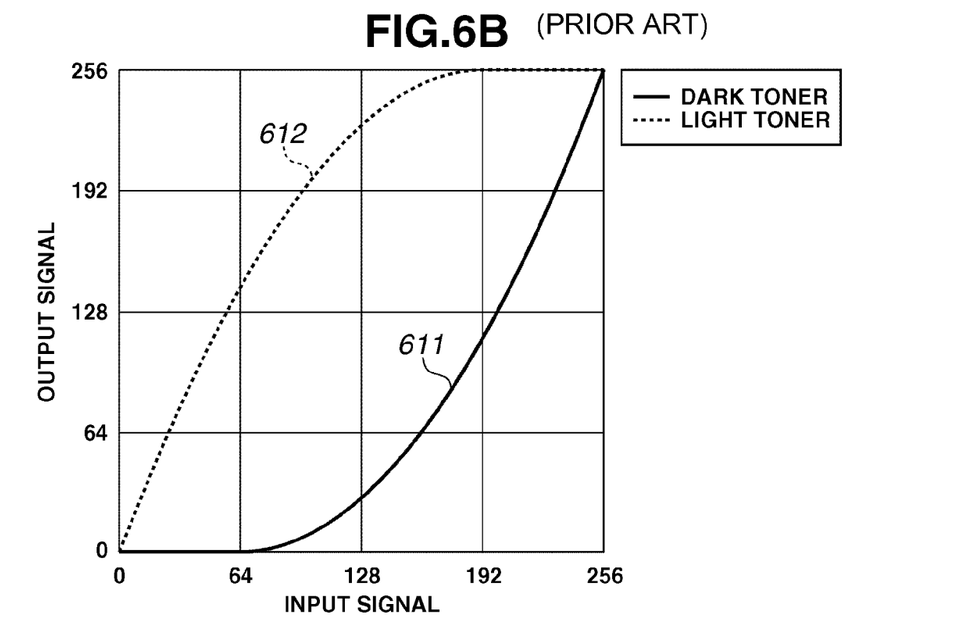

The LUTs described above are only examples, and there are cases where the light toner output signal decreases with an increase in the output signal value for the dark toner, as indicated in a light toner LUT 602 and a dark toner LUT 601 in FIG. 6. In addition, although the LUT changes linearly in the examples shown in FIGS. 5 and 6A, this is not a limitation. As indicated in a light toner LUT 612 and a dark toner LUT 611 in FIG. 6B, the LUT can also change in a curved form. Furthermore, as in FIG. 6B, the gradation value of the input signal near 64 becomes the switching point for the dark toner, and the gradation value of the input signal near 192 becomes the switching point for the light toner, so that the switching points of the dark and light colors do not match. In addition, although colors M and C are the subjects of the light and dark color materials in the above description, they are not limited to these two color materials.

Referring back to FIG. 3, the frequency characteristic of the image signals on which color separation has been conducted as described above is corrected in a spatial filtering unit 2 (306). The spatial filtering unit 2 (306) mainly conducts edge enhancement. Next, the output characteristic of the image signals is corrected in an output gamma correction unit 307 for each color component using a one-dimensional LUT. A pseudo-halftone process is then conducted at the bit number/resolution adapted to the grayscale reproducibility of the printer unit in a halftone processing unit 308. The pseudo-halftone signal is sent to the printer unit. Here, the grayscale reproducibility of the printer unit is assumed to be 4 bits/600 dpi. However, the number of bits or the resolution is not limited to these values. The halftone processing is assumed to be a known screen processing or error diffusion process.

Figure 7:
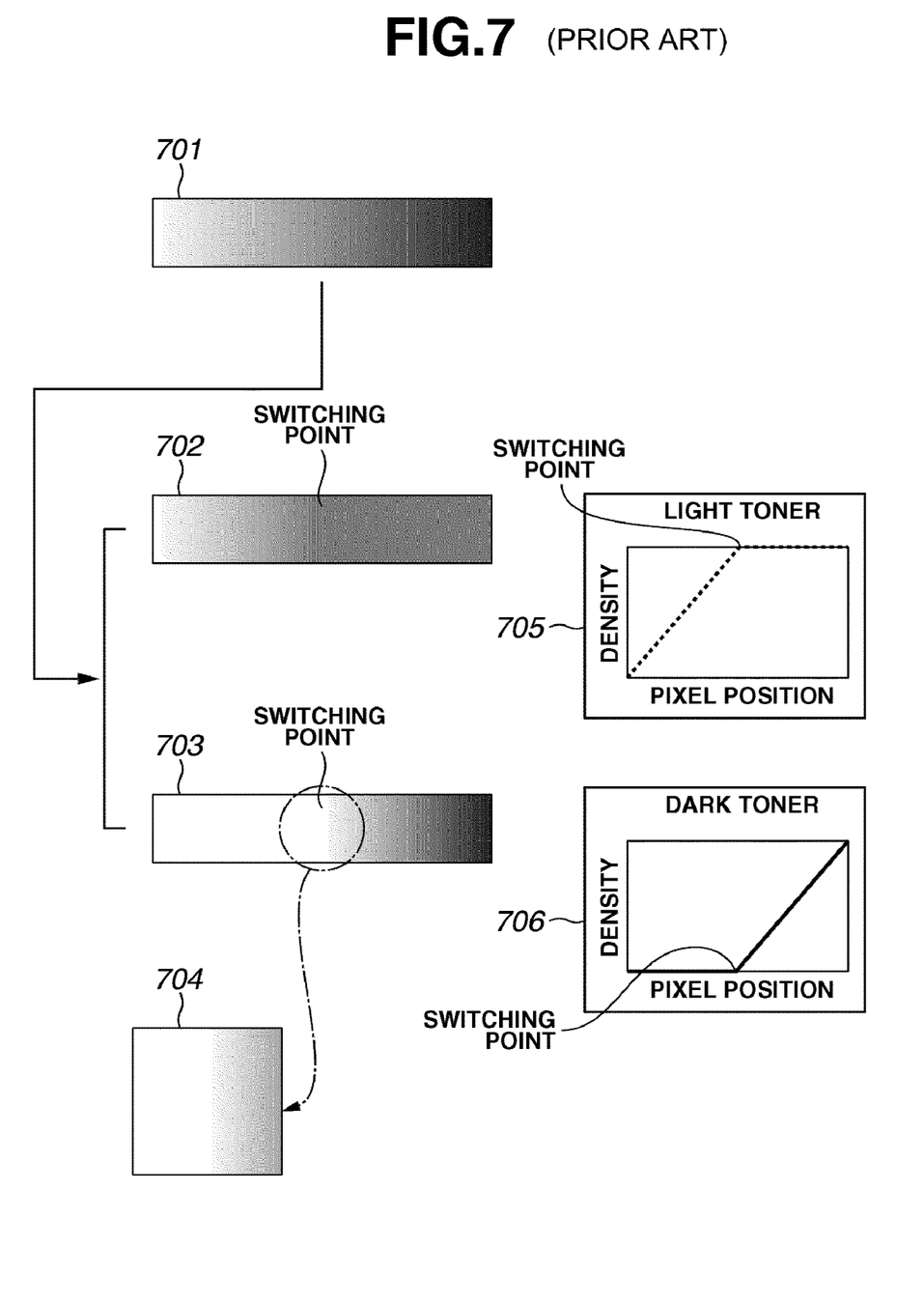
FIG. 7 shows an example of gradation images indicated by dark toner data and light toner data before and after the dark and light color separation process.

In the case where a conventional image processing configuration as described above is used, a gradation image 701 shown in FIG. 7 represented by color component data for a dark toner before the dark and light color separation is performed is separated into a dark toner color component signal M and a light toner color component signal m with the LUT 501 and the LUT 502 shown in FIG. 5. As a result, the gradation image 701 is separated into light toner color component data 702 and dark toner color component data 703. The gradation value (signal value) of each data in correspondence with the pixel position can be shown graphically as a dark toner data signal value distribution 706 and a light toner color data signal value distribution 705.

As indicated by these distributions, each data has a switching point in the corresponding pixel position. To be more precise, the switching point in the dark toner data is where the signal value changes from 0 to 1. This point is shown as an enlarged view 704 in FIG. 7. In FIG. 7, the signal value is increasing smoothly, although it is exaggerated for the purpose of explanation. In addition, the light toner data has a switching point existing in the same pixel position.

When image processing as shown in FIG. 3 is conducted on the above image data, filtering is conducted in the spatial filtering unit 2 (306) following the above-mentioned color separation process in the color separation unit 2 (305). In the case where the filtering process is an edge enhancement process, a density gap can occur in the gradation area.

Figure 8A:
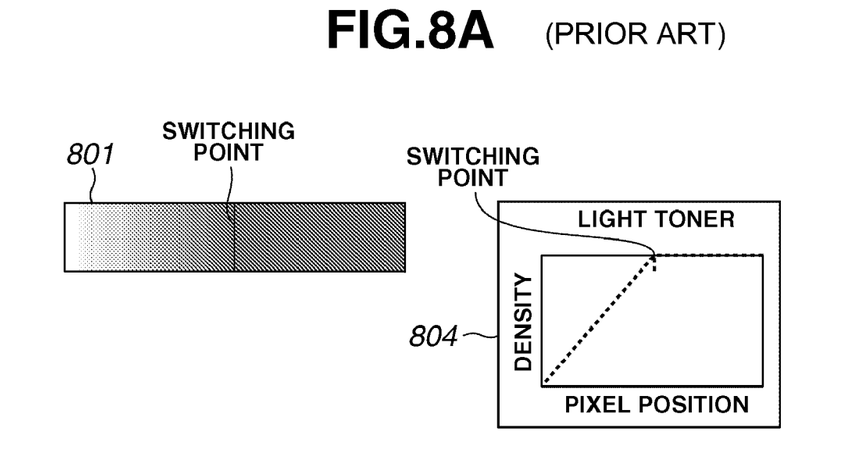
FIGS. 8A and 8B are diagrams for illustrating the generation of a density gap in a gradation image caused by the color separation process.
Figure 8B:
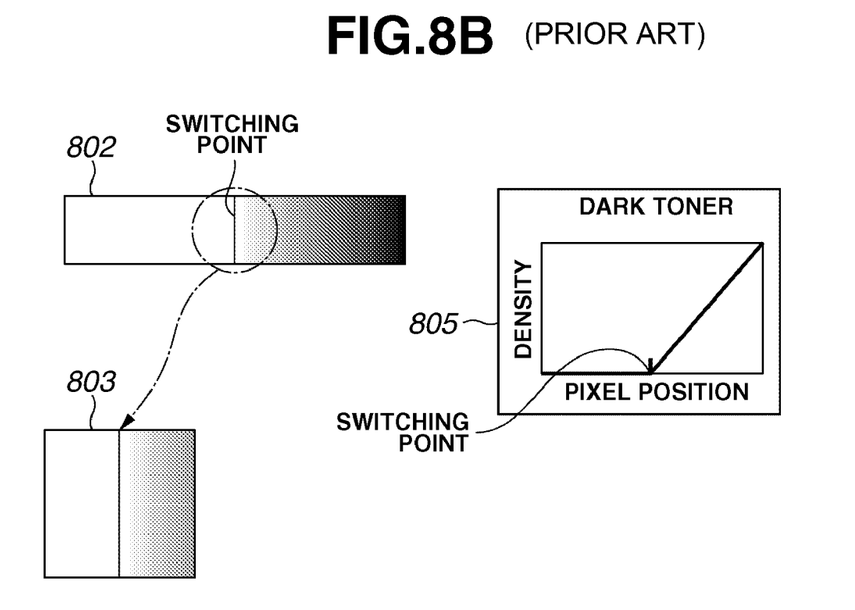
Figure 9:
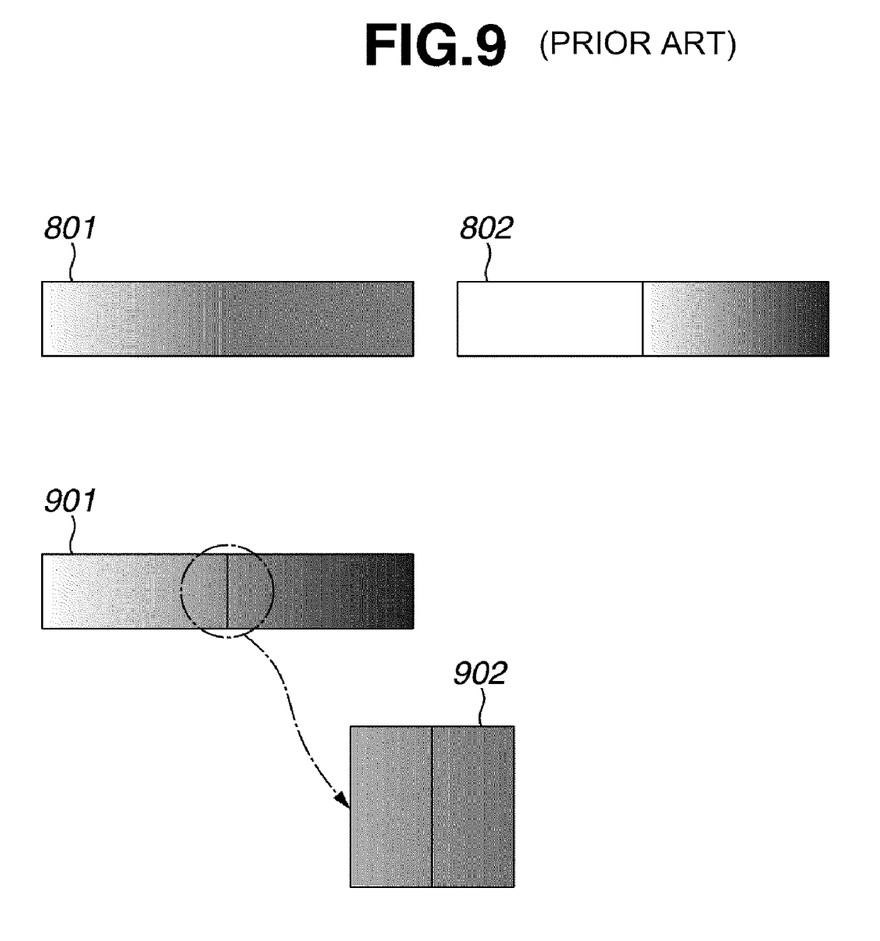
FIG. 9 is a diagram for further illustrating the generation of a density gap in a gradation image caused by the color separation process.

FIGS. 8A, 8B, and 9 illustrate how the density gap is generated.

FIG. 8A shows edge enhancement data 801 and a density value distribution 804 of the light toner color component data obtained by conducting an edge enhancement process on the light toner color component data 702 (FIG. 7). As shown in FIG. 8A, edge enhancement is conducted at the switching point at which the signal value (density value) begins to reach 255, and the density difference before and after this point becomes large. In addition, FIG. 8B shows edge enhancement data 802 and a density value distribution 805 of the dark toner data obtained by conducting an edge enhancement process on the dark toner data 703 (FIG. 7). As shown in FIG. 8B, edge enhancement is conducted on the switching point (shown in an enlarged view 803) at which the signal value (density value) begins to rise from 0, and the density difference before and after this point becomes large.

Furthermore, when printing is performed after halftone processing is performed on each of the edge enhancement data 801 for a light toner and the edge enhancement data 802 for a dark toner, a printed image 901 is obtained as shown in FIG. 9. In this instance, a density gap can occur at the gradation value corresponding to the switching point (128 in the example shown in FIG. 9). As shown in an enlarged view 902 of the density gap, since the density of the dark toner in particular is originally high, the density value in printing becomes larger than in the signal level, so that the density gap becomes conspicuous.

Figure 10:
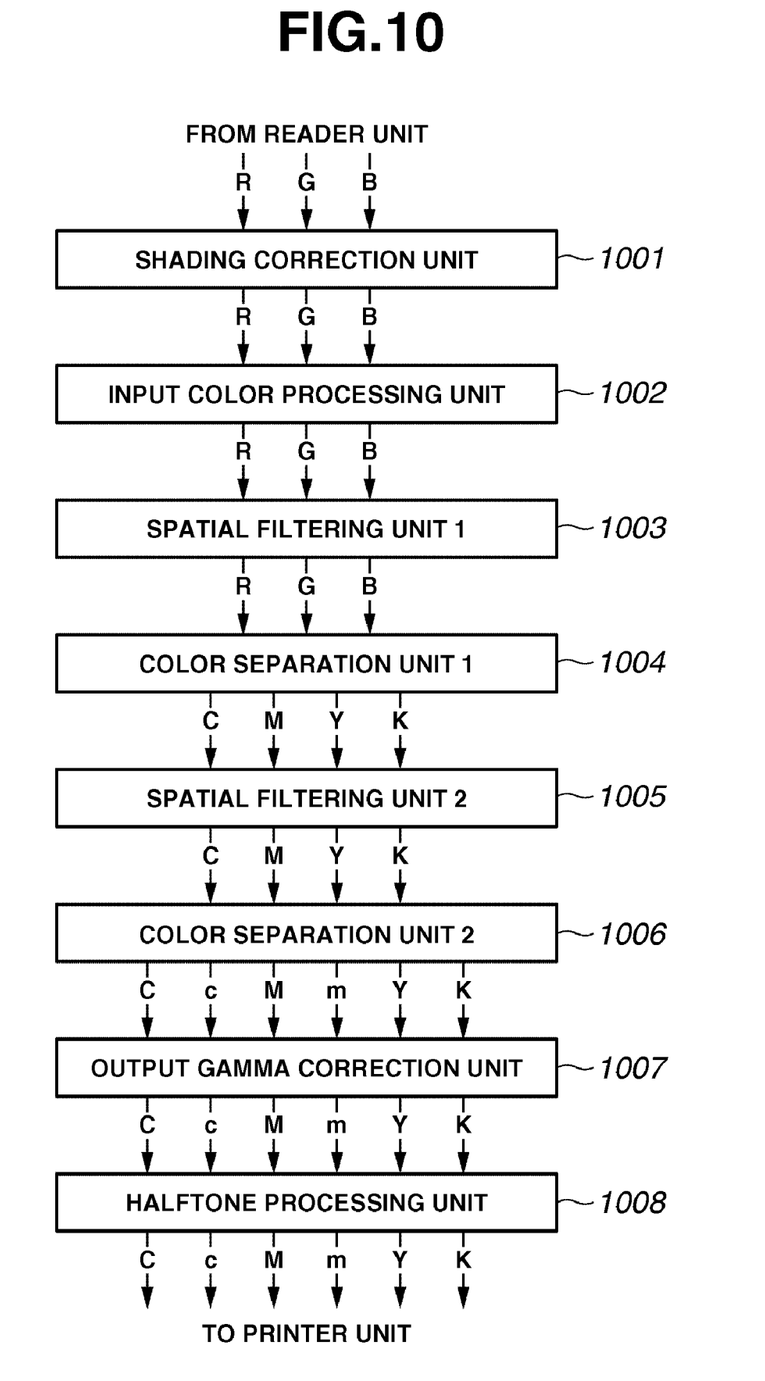
FIG. 10 is a block diagram of an image processing unit according to a first exemplary embodiment of the present invention.

In order to prevent or reduce a density gap from being generated as described above, the present exemplary embodiment employs an image processing configuration as shown in FIG. 10. The configuration shown in FIG. 10 differs from that of FIG. 3 in that a process in a color separation unit 2 (1006) is conducted after that of a spatial filtering unit 2 (1005).

More specifically, the spatial filtering unit 2 (1005) conducts an edge enhancement process as described above. After this, color separation is conducted on the edge-enhanced C, M, Y, and K signals in a color separation unit 2 (1006) to obtain color component signals C, c, M, m, Y, and K. As described above, edge enhancement is conducted on each of data C, M, Y, and K before color separation. Accordingly, a section where a density change unrelated to an image, such as a switching point described above, is large will not exist when conducting a process such as edge enhancement in which the change in the gradation is relatively local. Furthermore, as a color separation process for obtaining dark and light color component data is conducted after edge enhancement, the edge enhancement on each of the dark and light color component data can be avoided.

In addition, by conducting edge enhancement on the C, M, Y, and K signals, the hue of the pixels that are enhanced can be maintained. The C, M, Y, and K signals are obtained by conducting color separation on the image signals for printing. By conducting edge enhancement on these signals, the signal intensity of each channel changes in the same way. For this reason, the hue is maintained even though the density is changed.

On the other hand, if edge enhancement is conducted on the R, G, and B signals, the hue will change. Even when color separation is conducted on such R, G, and B signals to obtain the C, M, Y, and K signals for printing, the hue remains changed from that of the original R, G, and B signals. In particular, since an intensified edge enhancement is conducted on colored characters that are recognized as characters, it is undesirable to conduct edge enhancement on the R, G, and B signals.

Furthermore, by conducting edge enhancement on the C, M, Y, and K signals, the desired frequency band can be enhanced. In the case where edge enhancement is conducted on the R, G, and B signals, the conversion of the signals to C, M, Y, and K signals is ultimately needed. Since this conversion is non-linear, the desired frequency band will not be enhanced. In addition, as other image processing to be conducted after the edge enhancement is assumed to be non-linear, it is desirable to conduct edge enhancement on the C, M, Y, and K signals.

While two types of toners, dark and light color toners, of similar colors have been described in the present exemplary embodiment, the embodiment is not limited to only two types. The embodiment can also be applied to a case with more than two types of toners, such as light, regular, and dark toners. In addition, while a single color gradation has been described in the present exemplary embodiment, the embodiment can be applied to a mixed color gradation. In addition, while an RGB image read out form the reader unit has been described in the present exemplary embodiment, a similar method can be used on PDL data from sources such as a personal computer. Whether the PDL data is an RGB input or a CMYK input, a similar method can be used by setting an external input interface in accordance with the number of channels of the signal. Furthermore, the bit number of an image is not limited to 8 bits. These points also apply to the following exemplary embodiments.

Second Exemplary Embodiment

The second exemplary embodiment is directed to preventing a density gap in a printed image, which can be caused by an under color removal process for removing the background color of an original image.

Figure 11:
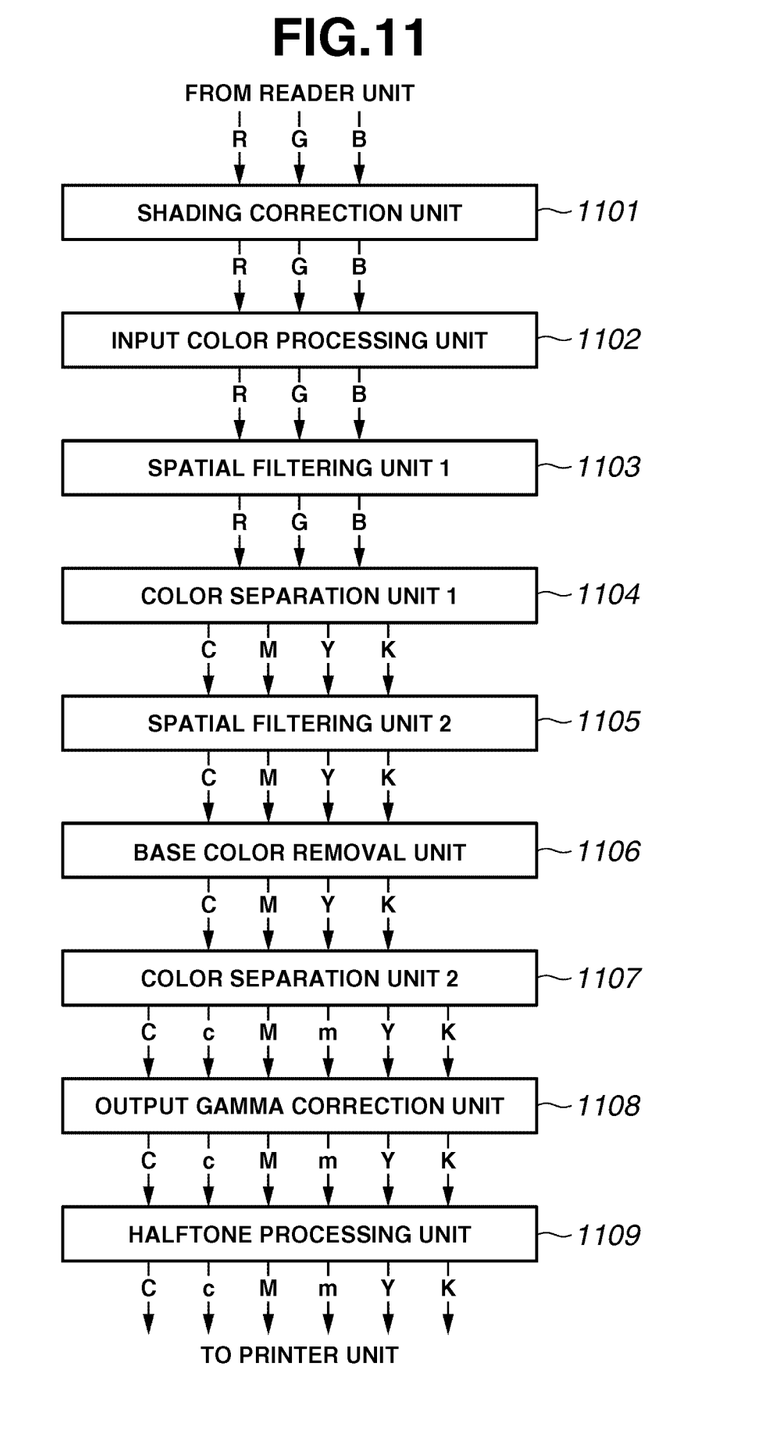
FIG. 11 is a block diagram of an image processing unit according to a second exemplary embodiment of the present invention.

FIG. 11 is a block diagram showing an image processing configuration of the second exemplary embodiment, which is similar to FIG. 10 of the first exemplary embodiment. The difference is that an under color removal process is conducted on image data in a background color removal unit 1106 after an edge enhancement process is conducted in a spatial filtering unit 2 (1105), and after the under color removal process, dark and light color signals C, c, M, m, Y, and K are obtained in a color separation unit 2 (1107).

The under color removal process removes data having density values lower than a predetermined density. For example, when an under color removal process is conducted on each of the dark and light color data 702 and 703 shown in FIG. 7 after division into the dark and light colors, data having density values lower than a predetermined density is removed from each color data. As a result, a section in which the density changes drastically at the pixel position corresponding to the predetermined density is generated in each of the density distributions 705 and 706. These sections can appear as a density gap in a printed image, which is a combined result of these sections.

In contrast, according to the second exemplary embodiment, color separation (1107) is conducted after the background color removal (1106). Accordingly, color separation is conducted on the image data in which the background color has been removed, to generate dark and light color data. Therefore, an unintended density changing area can be prevented from occurring in each of the dark and light color data, and a density gap can be reduced in a final printed image.

Third Exemplary Embodiment

The third exemplary embodiment is directed to preventing a density gap in a printed image, which can be caused by a color balance process for conducting color adjustment in an original image.

Figure 12:
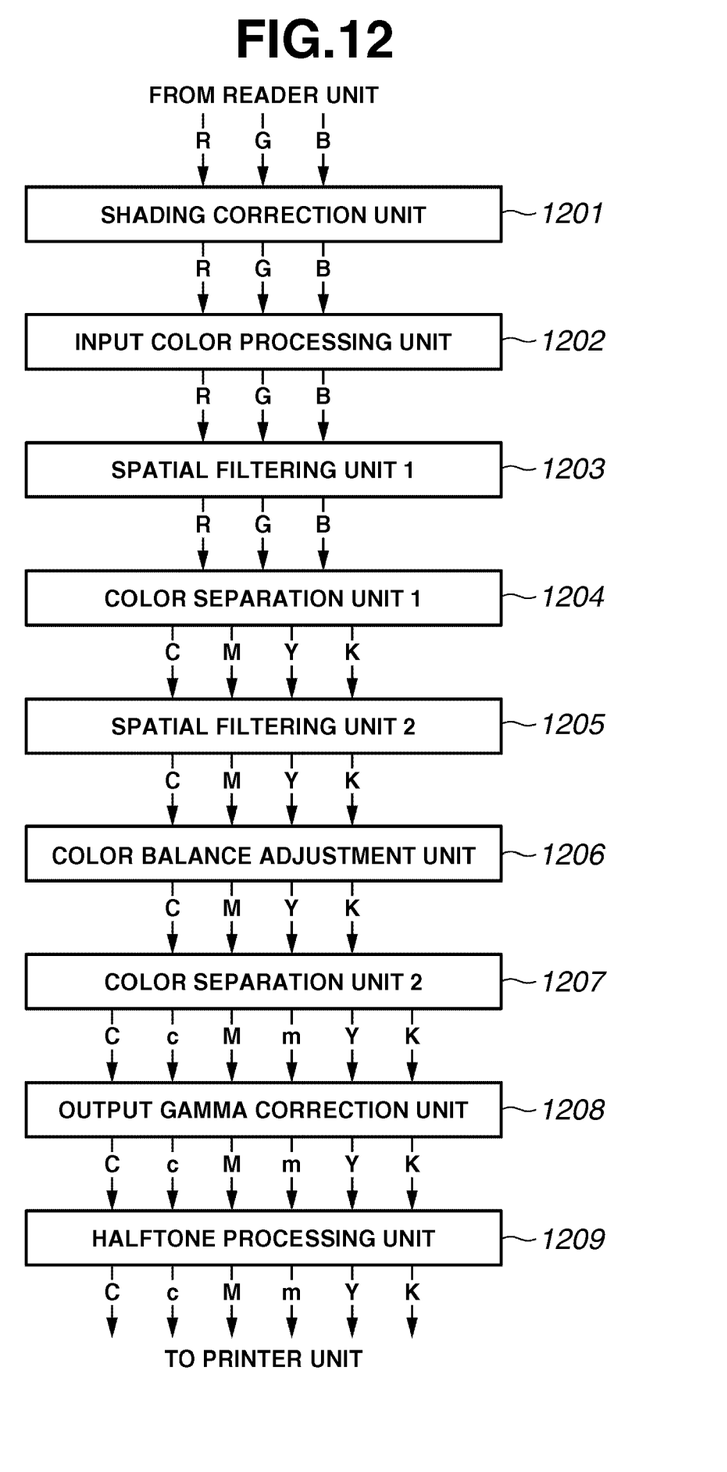
FIG. 12 is a block diagram of an image processing unit according to a third exemplary embodiment of the present invention.

FIG. 12 is a block diagram of an image processing configuration according to the third exemplary embodiment, which is similar to FIG. 10 of the first exemplary embodiment. The difference is that the color adjustment of an image is conducted in a color balance adjustment unit 1206 after an edge enhancement process is conducted in a spatial filtering unit 2 (1205), and after the color adjustment process, dark and light color signals C, c, M, m, Y, and K are obtained in a color separation unit 2 (1207).

Generally, conducting a color balance process changes the entire grayscale characteristic of an image. For example, when a color balance process is conducted on each of the dark and light color data 702 and 703 after division into the dark and light colors, the density distributions 705 and 706 change in whole. As a result, unintended density nonuniformity can be generated in a printed image obtained by combining these data.

In contrast, according to the third exemplary embodiment, color separation (1207) is conducted after the color balance adjustment process (1206) as shown in FIG. 12. Accordingly, color separation can be conducted on the image data on which the color balance adjustment is made, to generate dark and light color data. Therefore, the generation of a density gap in a final printed image can be prevented or reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-222992 filed Aug. 1, 2005, which is hereby incorporated by reference herein in its entirety.

What is claimed is:

1. A printer comprising:

a smoothing process unit configured to perform a smoothing process to RGB image signals;

a first color separation unit configured to separate colors of the RGB signals to which the smoothing process is performed and to obtain CMYK image signals;

an edge enhancement process unit configured to perform an edge enhancement process to the obtained CMYK image signals;

a background color removal unit configured to perform background color removal to the edge-enhanced CMYK image signals;

a second color separation unit configured to separate colors of the background-color-removed CMYK image signals and to obtain CcMmYK signals, c being lighter than C and m being lighter than M;

a gamma correction unit configured to perform gamma correction to the obtained CcMmYK signals; and a halftone process unit configured to perform a pseudo-halftone process to the gamma-corrected CcMmYK signals.

2. An image processing method for controlling an image processing apparatus to form an image using a plurality of color materials of similar colors and of different densities, the method comprising:

controlling the image processing apparatus to perform a smoothing process for smoothing RGB image signals;

applying a first color separation process to the smoothed RGB signals to separate colors of the RGB signals to obtain CMYK image signals;

performing an edge enhancement process to the obtained CMYK image signals;

applying background color removal to the edge-enhanced CMYK image signals;

applying a second color separation process to separate colors of the background-color-removed CMYK image signals to obtain CcMmYK signals, c being lighter than C and m being lighter than M;

performing a gamma correction process to apply gamma correction to the obtained CcMmYK signals; and applying a pseudo-halftone process to the gamma-corrected CcMmYK signals.

* * * * *